(12) United States Patent
Hultén

(10) Patent No.: US 10,858,040 B2
(45) Date of Patent: Dec. 8, 2020

(54) METHOD FOR THE CONTROL OF VEHICLE STEERING AND VEHICLE BEHAVIOUR

(71) Applicant: Sentient IP AB, Gothenburg (SE)

(72) Inventor: Johan Hultén, Gothenburg (SE)

(73) Assignee: SENTIENT IP AB, Gothenburg (SE)

( * ) Notice: Subject to any disclaimer, the term of this patent is extended or adjusted under 35 U.S.C. 154(b) by 284 days.

(21) Appl. No.: 16/075,617

(22) PCT Filed: Feb. 5, 2017

(86) PCT No.: PCT/SE2017/050100
§ 371 (c)(1),
(2) Date: Aug. 4, 2018

(87) PCT Pub. No.: WO2017/135884
PCT Pub. Date: Aug. 10, 2017

(65) Prior Publication Data
US 2019/0047618 A1 Feb. 14, 2019

(30) Foreign Application Priority Data

Feb. 5, 2016 (SE) ..................................... 1630022

(51) Int. Cl.
*B62D 6/00* (2006.01)
*B60W 10/20* (2006.01)
(Continued)

(52) U.S. Cl.
CPC ............ *B62D 6/008* (2013.01); *B60Q 5/005* (2013.01); *B60W 10/20* (2013.01); *B60W 10/30* (2013.01);
(Continued)

(58) Field of Classification Search
CPC ........ B62D 6/008; B62D 15/025; B62D 6/00; B62D 15/0265; B62D 6/005; B62D 7/148;
(Continued)

(56) References Cited

U.S. PATENT DOCUMENTS 5,307,892 A * 5/1994 Phillips ..................... B62D 5/09
180/422
5,388,658 A * 2/1995 Ando ................. B60K 23/0808
180/197

(Continued)

FOREIGN PATENT DOCUMENTS

CN 101657345 2/2010
CN 102470864 5/2012
(Continued)

OTHER PUBLICATIONS

Decision to Grant in corresponding European Patent Application No. 17705188.5-1013, dated Oct. 17, 2019, pp. 1.
(Continued)

*Primary Examiner* — Hunter B Lonsberry
*Assistant Examiner* — Luis A Martinez Borrero
(74) *Attorney, Agent, or Firm* — Jeffrey S. Melcher; Melcher Patent Law PLLC (57) ABSTRACT

Methods for controlling a feedback torque actuator and at least one yaw and/or lateral vehicle state actuator in a steer-by-wire steering system include measuring an input signal with a sensor, determining from the input signal a measure of a torque applied by the driver via a steering wheel, transforming the measure to a desired yaw and/or lateral vehicle state, controlling the yaw and/or lateral vehicle state actuator for vehicle state control, and defining a steering-wheel torque to steering-wheel angle relation describing steering feel. If the vehicle position control
(Continued)

results in a yaw and/or lateral vehicle state error, this error is transformed to a change in the steering-wheel torque to steering-wheel angle relation describing steering feel. This new steering feel relation is used as an input signal for controlling the feedback torque actuator in order for the driver to get feedback of the yaw and/or lateral vehicle state error.

10 Claims, 2 Drawing Sheets

(51) Int. Cl.
  B60W 10/30     (2006.01)
  B60W 30/02     (2012.01)
  B60Q 5/00      (2006.01)
(52) U.S. Cl.
  CPC ....... *B60W 30/02* (2013.01); *B60W 2510/202* (2013.01); *B60W 2710/202* (2013.01); *B60W 2720/00* (2013.01); *B60W 2720/14* (2013.01)
(58) Field of Classification Search
  CPC ......... B62D 6/04; B62D 7/159; B60W 10/20; B60W 2540/10; B60W 2540/18; B60W 30/18127; B60W 10/30; B60W 30/02; B60W 2510/202
  See application file for complete search history.

(56) References Cited

U.S. PATENT DOCUMENTS

| | | | | |
|---|---|---|---|---|
| 5,925,082 A * | 7/1999 | Shimizu | ................... | B62D 6/00 180/272 |
| 6,219,604 B1 * | 4/2001 | Dilger | ................... | B62D 6/003 180/422 |
| 6,282,478 B1 * | 8/2001 | Akita | ................... | B60T 8/17557 701/70 |
| 6,640,173 B1 * | 10/2003 | Zheng | ................... | B60T 8/1755 180/410 |
| 6,691,009 B1 * | 2/2004 | Yao | ................... | B62D 6/002 180/402 |
| 6,694,239 B1 * | 2/2004 | Yao | ................... | B62D 6/002 180/410 |
| 6,718,243 B1 * | 4/2004 | Yao | ................... | B62D 5/001 180/402 |
| 6,757,601 B1 * | 6/2004 | Yao | ................... | B62D 6/002 180/402 |
| 6,799,104 B2 * | 9/2004 | Yao | ................... | B62D 5/001 701/41 |
| 6,895,318 B1 * | 5/2005 | Barton | ................... | B60T 8/1755 180/204 |
| 7,165,644 B2 * | 1/2007 | Offerle | ................... | B60T 8/1755 180/244 |
| 8,073,608 B2 * | 12/2011 | Hulten | ................... | B62D 6/003 701/91 |
| 8,694,209 B2 * | 4/2014 | Tokimasa | ................... | B60W 10/184 701/41 |
| 8,751,111 B2 * | 6/2014 | Wilson-Jones | .......... | B62D 6/00 701/42 |
| 9,421,883 B2 * | 8/2016 | Drako | ................... | B60L 50/51 |
| 10,005,455 B2 * | 6/2018 | Hulten | ................... | B60T 8/1755 |
| 2003/0220727 A1 * | 11/2003 | Husain | ................... | B62D 6/008 701/41 |
| 2004/0016294 A1 * | 1/2004 | Sugitani | ................... | B60W 40/101 73/146 |
| 2004/0107032 A1 * | 6/2004 | Farrelly | ................... | B62D 6/04 701/42 |
| 2004/0138796 A1 * | 7/2004 | Yao | ................... | B62D 6/008 701/41 |
| 2005/0189161 A1 | 9/2005 | Zheng et al. | | |
| 2005/0189163 A1 * | 9/2005 | Barton | ................... | B62D 6/003 180/446 |
| 2005/0209751 A1 | 9/2005 | Kato | | |
| 2005/0246101 A1 * | 11/2005 | Courtenay | ........... | B62D 15/025 701/301 |
| 2006/0080016 A1 * | 4/2006 | Kasahara | ................. | B62D 6/001 701/41 |
| 2006/0289226 A1 * | 12/2006 | Sugitani | ................. | B62D 6/008 180/402 |
| 2007/0299580 A1 * | 12/2007 | Lin | ...................... | B62D 15/025 701/41 |
| 2008/0040002 A1 * | 2/2008 | Galkoswki | ............. | B62D 6/003 701/43 |
| 2008/0109134 A1 * | 5/2008 | Bolourchi | ............. | B62D 6/002 701/41 |
| 2008/0164087 A1 * | 7/2008 | Koyama | ................ | B62D 6/008 180/402 |
| 2009/0271070 A1 * | 10/2009 | Feller | .................... | B62D 6/008 701/41 |
| 2009/0271074 A1 * | 10/2009 | Hulten | ................... | B62D 6/003 701/42 |
| 2009/0312909 A1 * | 12/2009 | Onuma | .................. | B62D 6/008 701/41 |
| 2011/0010054 A1 * | 1/2011 | Wilson-Jones | ........ | B62D 6/008 701/42 |
| 2012/0109464 A1 * | 5/2012 | Mizutani | ............... | B60W 10/08 701/42 |
| 2015/0175197 A1 * | 6/2015 | Heilig | .................... | B62D 6/008 701/42 |
| 2015/0246687 A1 * | 9/2015 | Takeda | ................. | B62D 15/025 701/41 |
| 2015/0251541 A1 * | 9/2015 | Drako | ................. | B60L 15/2045 701/22 |
| 2015/0259007 A1 * | 9/2015 | Di Cairano | .......... | B62D 15/025 701/41 |
| 2016/0090005 A1 * | 3/2016 | Drako | ................. | B60K 17/145 701/22 |
| 2016/0272197 A1 * | 9/2016 | Hulten | ................... | B62D 6/003 |
| 2018/0188705 A1 | 7/2018 | Linger | | |

FOREIGN PATENT DOCUMENTS

| | | |
|---|---|---|
| CN | 102612456 | 7/2012 |
| DE | 19912169 | 7/2000 |
| EP | 1228941 A2 | 8/2002 |
| EP | 1577194 A1 | 9/2005 |
| EP | 1698540 | 9/2006 |
| EP | 1698540 A1 | 9/2006 |
| WO | 02/22397 A1 | 3/2002 |
| WO | 2010/144049 A1 | 12/2010 |

OTHER PUBLICATIONS

EPO, Int'l Search Report in PCT/2017/050100, dated Apr. 20, 2017.
EPO, Written Opinion in PCT/2017/050100, dated Apr. 20, 2017.
Search Report issued in corresponding Chinese patent application Serial No. 201780009900.4 dated Mar. 16, 2020, pp. 1-3.
Office Action issued in corresponding Chinese patent application Serial No. 201780009900.4 dated Mar. 20, 2020, pp. 1-10.

* cited by examiner

METHOD FOR THE CONTROL OF VEHICLE STEERING AND VEHICLE BEHAVIOUR

TECHNICAL FIELD

The present invention relates to a method for controlling a feedback torque actuator in a steer-by-wire steering system and at least one yaw and/or lateral vehicle state actuator such as a steering position actuator in a steer-by-wire steering system incorporating the following method steps for the yaw and/or lateral vehicle state control:
- measurement of at least one input signal with the aid of a sensor,
- determination from the above-mentioned input signal of a measure of a torque applied by the driver via a steering wheel,
- transformation of the above-mentioned input signal of a measure of a torque applied by the driver via a steering wheel to a desired yaw and/or lateral vehicle state, and
- control of the mentioned one or more yaw and/or lateral vehicle state actuators for the vehicle state control whereby the mentioned desired yaw and/or lateral vehicle state is used as an input signal to the controllers, and furthermore also incorporating the following method step for the feedback torque actuator control:
- a definition of a steering-wheel torque to steering-wheel angle relation describing steering feel The invention also relates to a corresponding device as well as a system for controlling a feedback torque actuator in a steer-by-wire steering system.

BACKGROUND OF THE INVENTION

Steer-by-wire has been available for aeroplanes for decades, and is now emerging on passenger vehicles. Steer-by-wire offer several benefits such as:
- a possibility to have a variable steering ratio, which means that the ratio between the steering wheel and the road wheels is not constant over vehicle speed,
- a decoupling between the steering rack and the steering column in order to make packaging more easy, especially to adopt for left lane vs right lane traffic, and
- a possibility to introduce a control functions where the steering wheel is not moving in accordance to the road wheel, such as e.g. an oversteer support by steering, in which the steering wheel is not moving when the road wheels are controlled to achieve a countersteer of the vehicle.

In order to achieve different benefits of steer-by-wire, several inventions have been made.

WO 0222397-A1 (Kaufman et. al.) presents a steer-by-wire control such that the steering feedback force is purely made from a mathematical model. The steering feel created by this model is mainly based on the signals steering-wheel angle and vehicle speed.

A totally different approach is presented in EP 1228941-A2 (Sanset et. al.) where a control is described such that the rack load is estimated and that the steering feedback actuator reference torque is based on this rack load. This means that the system "mimics" a traditional boost-curve based electric power assisted steering system.

Yet another approach is presented in US20050189161-A1 (Zheng and Lenart), where a steer-by-wire control that give the driver feedback from undesired situations such as understeer and oversteer.

The European patent application EP 2440442-A4 (Birk) presents a control concept for electric power assisted steering that is very close to steer-by-wire. The driver intention is based on the steering-wheel torque, and the steering wheel position is controlled to this driver intended position. Thus, the steering feel is free from disturbances, just as the steer-by-wire concept of Kaufman et. al.

Now, human beings cannot directly control the position of e.g. the arm, and hence not directly the steering-wheel angle. It can be proven that the applied steering wheel torque determines the intended vehicle path. This fact can easily be described by the driving scenario where an experienced driver countersteers in an oversteer situation. In such a situation, the steering-wheel angle will point in the opposite direction compared to the direction of travel. Hence, the steering-wheel angle cannot be an indicative for the driver intended path.

Summarising the above-mentioned state-of-the-art control principles for steer-by-wire and steering feel yields:

Sanset et. al. proposes:
- a position control concept based a pre-defied, vehicle speed dependent ratio between the steering wheel and the road wheels, and
- a feedback control concept where the rack forces are estimated in the position control actuator, followed by an inverse boost curve control based on the above-mentioned rack force to produce a feedback torque at the steering wheel.

Kaufman et. al. proposes:
- a position control concept based a pre-defied, vehicle speed dependent ratio between the steering wheel and the road wheels, and
- a feedback control concept where a mathematical model describes the steering feel torque as a function of the steering-wheel angle and the vehicle speed to produce a feedback torque at the steering wheel.

Zheng and Lenart proposes:
- a delta torque on the steering wheel actuator to give feedback of understeer or oversteer.
- a position control based on the steering-wheel angle, as an indicative of the driver intention.

In the first concept, the steering feel of a traditional boost-curve based electric power steering is mimicked with all its pros and cons. For instance, even if the steering wheel and the road wheels are physically disconnected, disturbances from the road are still fed to the driver. On the other hand, such disturbances can improve the feel of being connected to the road wheels. The potential of steer-by-wire is however not fully utilized as the rack force is based on how the wheel forces comes into the rack and hence dependent on the steering system concept and geometry.

In the second concept, the steering feel is purely artificial, and can result in an artificial and disconnected feeling. On the other hand, no disturbances are fed to the driver. And regarding the system design and geometry, full hardware independence is achieved and thus taking the full potential from a steer-by-wire system.

Another aspect of steer-by-wire control is intervention control. With intervention we mean that for instance during an oversteer scenario; the road wheels can be used to countersteer and stabilise the vehicle. In a steer-by-wire vehicle, the steering wheel does not need to move during such an intervention. On the other hand, the driver would probably want to get proper feedback of such control. If he knows that an intervention is made, he can at least consider reducing e.g. the vehicle speed.

In the third concept, such feedback is given, but the driver intention is not updated to take the new resulting steering-wheel angle change into account for driver intention calculation.

So, current state-of-the-art steer-by-wire control give either no feedback at all during an intervention, a feedback that is based on the steering system design and geometry or a feedback where the information about driver intentended path is lost.

Birk's controller for electric power addresses the problem of achieving the driver intended vehicle path, but not how to give feedback to the driver in the case of an intervention in a steer-by-wire system.

In order to solve the problem of having good feedback during an intervention as well as taking the full potential out of the steer-by-wire system, we propose a new control based on the following principles:
1. to establish the driver's intended vehicle path and control the vehicle accordingly, and
2. to give the driver feedback about the vehicle motion.

SUMMARY OF THE INVENTION

The purpose of the present invention is thus, at least in part, to eliminate the above-mentioned problems by means of an improved method for controlling two or more steer-by-wire steering actuators included in a steering system for a vehicle so that the vehicle is controlled and stabilized to the path indicated by the driver and that the driver gets feedback of understeer and oversteer.

This purpose is achieved with a method for controlling a steer-by-wire system for a vehicle according to the characterising portion of claim 1

An input signal can for example be the measure of a torque applied by the driver via the steering wheel, measured somewhere between the steering wheel and the wheel, or a signal derived from this quantity.

The torque measured with a sensor includes a driver torque, which corresponds to that part of the torque, the steering torque, corresponding to the vehicle state, which the driver wishes to attain, and also a compensation torque which is the difference between the measured torque and the steering torque. Together with the steering torque, the function of the compensation torque is to describe the torque build-up of the vehicle in the steering wheel. The object of this is to calculate the steering torque. By compensating the measured torque with the compensation torque, an actual steering signal is obtained which corresponds directly to the desired pattern of movement in the vehicle.

As an example of a method in accordance with the invention, the compensation torque includes one or more of the following torque contributions: steering system friction torque, tyre friction torque, damping torque and steering wheel self-alignment torque.

The tyre friction torque takes into consideration the wheel angle, wheel angle history, vehicle position and vehicle velocity, which is important in the case of a low vehicle velocity, since the tyre contact changes more quickly than the twisting of the tyre at high velocities. The steering system friction torque takes into consideration the fact that the steering system needs to have a certain friction for the driver to be able to rest against, so that the whole steering torque does not have to be given by the driver. A certain hysteresis is also needed so that the car is not felt to be "wobbly" or "unruly". The damping torque provides an important damping of the steering angle and thereby the vehicle response. Different damping outwards or inwards when driving straight ahead and when cornering can be preferable so that the damping will match the torque level and gradient. The steering wheel self-alignment torque means the steering wheel goes back to the straight-forward position also at velocities so low that there is no yaw and/or lateral vehicle state feedback. The steering wheel self-alignment torque can be an interpolation table or a software function.

Definitions

Actuators

A steering feedback actuator is an actuator, which can be used to influence either the steering-wheel torque or the steering-wheel angle.

A steering position actuator is an actuator, which can be used to influence the front road-wheel angles via controlling a steering rack position, a pinion angle, a Pitman arm angle or individual road-wheel angles.

A vehicle state controller is defined as a dynamic function for achieving a target state in a vehicle in a controlled manner.

A vehicle yaw and/or lateral vehicle state actuator is an actuator that when actuated influences one or several vehicle yaw and/or lateral vehicle state states. Vehicle yaw and/or lateral vehicle state actuators are rear wheel steering actuators, actuators controlling individual steering angles of the wheels, brakes, engine, controllable four-wheel-drive clutches, controllable differentials, active dampers, electric or hydraulic wheel motors and electrically or hydraulically driven axles, the camber angle on each axle, or the camber angle on each wheel.

An actuator is a mechanism or system that is operated by an ECU and converts a source of energy, typically electric current, hydraulic fluid pressure, or pneumatic pressure, into a motion, force or torque.

Vehicle States

A state is defined as a translational or rotational position, velocity or acceleration, or from these before-mentioned states derived states such as e.g. a vehicle slip angle, which is the angle between the vehicle local x-axis and the vehicle speed vector.

A steering angle is an angle corresponding in some way to the front road-wheel angles, measured somewhere in the steering system, and as the normal front road-wheel angles has Ackermann steering geometry, the steering angle is a linear combination, e.g. a mean value, of the two front road-wheel angles.

Ackermann steering geometry is a geometric arrangement of linkages in the steering of a car or other vehicle designed to solve the problem of wheels on the inside and outside of a turn needing to trace out circles of different radius.

A steering-wheel angle is here referred to as any angle between the steering wheel and the road wheel times the ratio between the angular degree of freedom and the steering-wheel angular degree of freedom. It can also be a rack position times its ratio between the rack translational degree of freedom to the steering-wheel angular degree of freedom.

Vehicle yaw rate is an angular speed around the z-axis of the vehicle, which is directed upwards and perpendicular to the xy-plane our plane of the ground.

Vehicle body sideslip angle is the angle between a vehicles actual direction of travel and the direction towards which it is pointing Vehicle lateral acceleration is the acceleration of the vehicle in the lateral direction.

Vehicle yaw and/or lateral vehicle state, namely any of or a linear combination of vehicle yaw rate or vehicle yaw acceleration, vehicle lateral speed or vehicle lateral acceleration and vehicle body sideslip angle.

A torsion-bar torque is a torque measured by the use of a sensor that is sensitive to a twist of a specific torsion bar that is mounted somewhere in the steering column.

A steering-wheel torque is the torque applied by the driver to the steering wheel. This steering-wheel torque is normally approximated by the torsion-bar torque.

A driver torque is equal to a steering-wheel torque.

Electric Architecture

A signal bus is a transmission path on which signals can be read and/or transmitted.

An input signal can for example be the measure of a torque applied by the driver via the steering wheel, measured somewhere between the steering wheel and the wheel, or a signal derived from this quantity.

An ECU is an electric control unit that is used to read analogue sensor signals and digital signals, that can come over e.g. a signal bus, perform any type of computations, such as e.g. perform a control task and actuate actuators, either via a sent analogue or digital signal or by directly controlling e.g. an electric motor from a motor control stage.

Control Theory

Control of an actuator means that a controller is used in order to achieve a desired state in that actuator in a controlled manner. In the case of several actuators to be controlled, the controller is used in order to achieve desired states in the before mentioned actuators in a controlled manner.

A controller is a dynamic function that from a series of input signals is used to calculate one or several controller signals in order to control one or several actuators. The number of possible controllers is infinite, and not of interest for the purpose of this application as there are different kinds of controllers, well known to a person skilled in the art, that can be used for the abovementioned control.

Controllability describes the ability of an external input to move the internal state of a system from any initial state to any other final state in a finite time interval.

Over-actuated system is a system where the number of actuators is greater than the number of degrees of freedom to be controlled.

target value, reference value or request is a set point for the actuator that is achieved by the use of either a closed loop controller and/or a feed-forward controller.

Transformation is defined as a mathematical function or lookup table with one or more input values used to produce one or more output values.

A steering-wheel torque measurement is a torque measured in the steering column or steering wheel or a force measured in the steering rack times the torque ratio between the steering rack and the steering wheel.

Frequency blending is a weighted sum in the frequency domain of two signals such that one of the signals is filtered by a certain filter and the other is filtered by a complementary filter. An example of frequency blending is to use a linear first order low-pass filter on one of the two signals and a linear first order high-pass filter on the other and the result of the two filters are summed together.

A complementary filter is a filter such that sum of the complementary filter and the filter that it is complementary to is one over the whole frequency range.

Vehicle Dynamics

A vehicle model is a mathematical model that transforms a road-wheel angle and a vehicle speed to a number of vehicle yaw and/or lateral states, namely vehicle yaw rate and acceleration, vehicle lateral speed and acceleration and vehicle body sideslip angle.

Understeer is defined as the situation where the vehicle steers less than the steering indicated by the vehicle model.

Oversteer is defined as the situation where the vehicle steers more than the steering indicated by the vehicle model.

Peak friction is where the tyre-to-road friction is fully utilised.

A Pneumatic trail is the distance between the centre of the tyre-to-road contact and the resultant of the side force of the tyre Steering Feel A base or normal steering-wheel torque is a torque that would occur without a torque ramp.

Dual torque injection. In such a dual torque injection, the delta steering-wheel torque is added both before and after the boost curve, and hence, the boost curve is moved along a line with a negative gradient 1 so that the delta steering-wheel torque shifts the equilibrium position.

A torque reference generator is a steering feel control concept where the steering-wheel torque is calculated in a reference generator, and this reference steering-wheel torque is then compared to a measured steering-wheel torque and the difference, the steering-wheel torque error, is fed to a controller so that this error is minimised.

An angle reference generator is a steering feel control concept where the steering-wheel angle is calculated in a reference generator, and this reference steering-wheel angle is then compared to a measured steering-wheel angle and the difference, the steering-wheel angle error, is fed to a controller so that this error is minimised.

Reference Generator Sub-Functions

A tyre friction torque is the friction between the tyres and the road or a model of this friction.

A steering system friction or a friction torque is the friction of the parts of the linkage of the steering system or a model of this friction.

A damping torque occurs owing to damping of the tyres and the steering system or a model of this damping.

A returnability torque comes from the geometry of the steering system or a model of the steering system.

A compensation torque is the sum of the above-mentioned tyre friction torque, the friction torque, the damping torque and the returnability torque. The parts of the compensation torque are calculated from mathematical models of the different torque parts.

The mathematical model of the tyre friction torque is a model of an angle or angular speed driven hysteresis. The mathematical model of the tyre also contains a relaxation part such that as the tyre rolls, the torque of the hysteresis will have a relaxation length so that the hysteresis torque decreases with the rolling length of the tyre. The relaxation can preferably be the well-known half-life exponential decay function.

The model of the tyre friction is the combination of the hysteresis and the relaxation so that e.g. an increase owing to the hysteresis torque can happen at the same time as the torque decrease owing to the relaxation. The resulting torque of the model is the sum of the two parts.

The mathematical model of the friction torque is a model of an angle or angular speed driven hysteresis. The maximum torque in the hysteresis can be shaped by a function so that the maximum torque is different on centre compared to off centre.

The mathematical model of the damping torque consists of a damping constant times an angular speed or translational speed, such as e.g. the rack velocity, measured somewhere in the linkage between the road wheels and the steering wheel. The damping constant can be such that the damping has a blow-off, such that the damping constant decreases for great angular or translational speeds. The damping constant can be vehicle speed dependent as well as different for steering outwards compared to inwards. The damping constant can also be a function of the steering-wheel or torsion-bar torque.

The returnability torque is a vehicle speed dependent and steering-wheel angle dependent torque.

BRIEF DESCRIPTION OF THE FIGURES

The invention will be described in greater detail hereafter, with reference to the preferred embodiments, which show the signal flow and also the elementary calculation steps for a steering control according to the invention.

Figure 1:
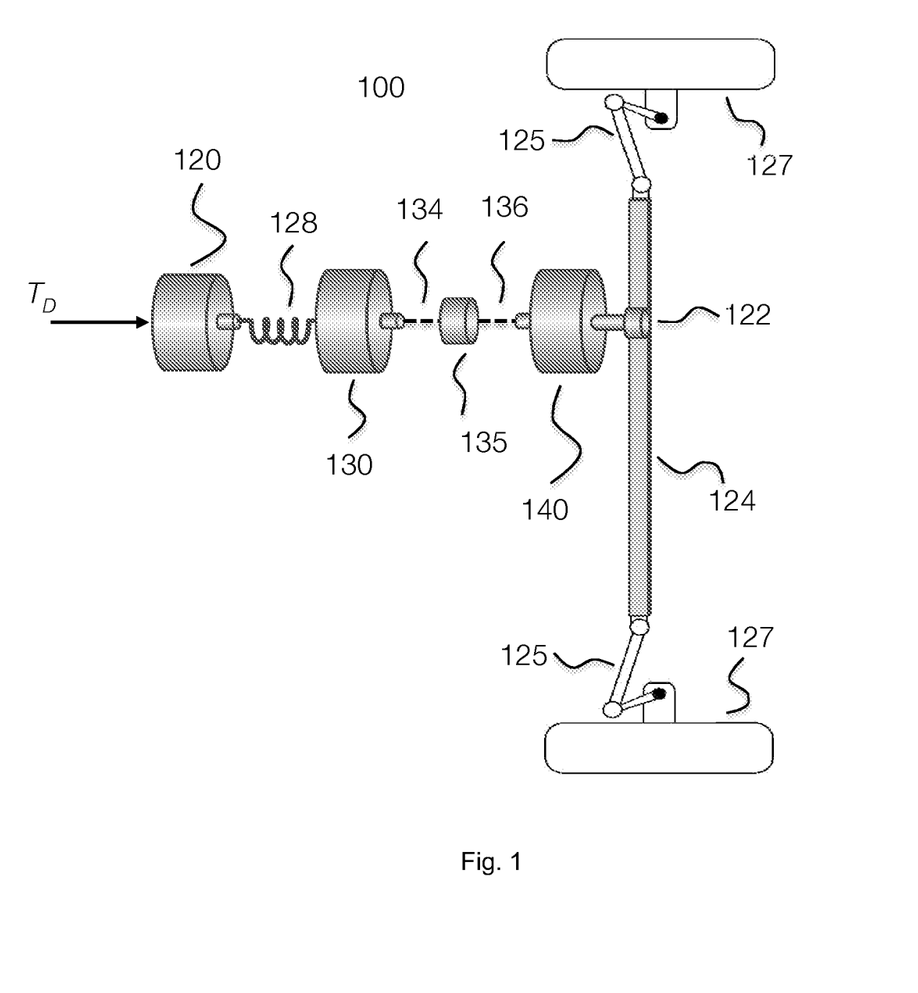
FIG. 1. Steering system for steer-by-wire vehicle steering.

FIG. 1 is a schematic figure of a steering system for steer-by-wire (100). In a steer-by-wire steering system of a vehicle there is a linkage between the front axle road wheels (127) and the steering position actuator (140). The linkage consists of a steering rack (124) with associated tie rods (125) connected via a pinion (122) to the steering position actuator (140). The steering position actuator consists of an assistance motor and an ECU. The steering column incorporates a torsion bar (128) with a torque sensor for measuring the steering torque applied by the driver. The assistance torque is actuated by a steering feedback actuator (130), which consists of an assistance motor and an ECU. The driver applies the driver torque, TD, in the steering wheel (120). Between the steering feedback actuator (130) and the steering position actuator (140), there can be an intermediate shaft with an upper portion (134) and a lower portion (136). These two portions of the intermediate shaft is connected by a safety clutch (135).

Figure 2:
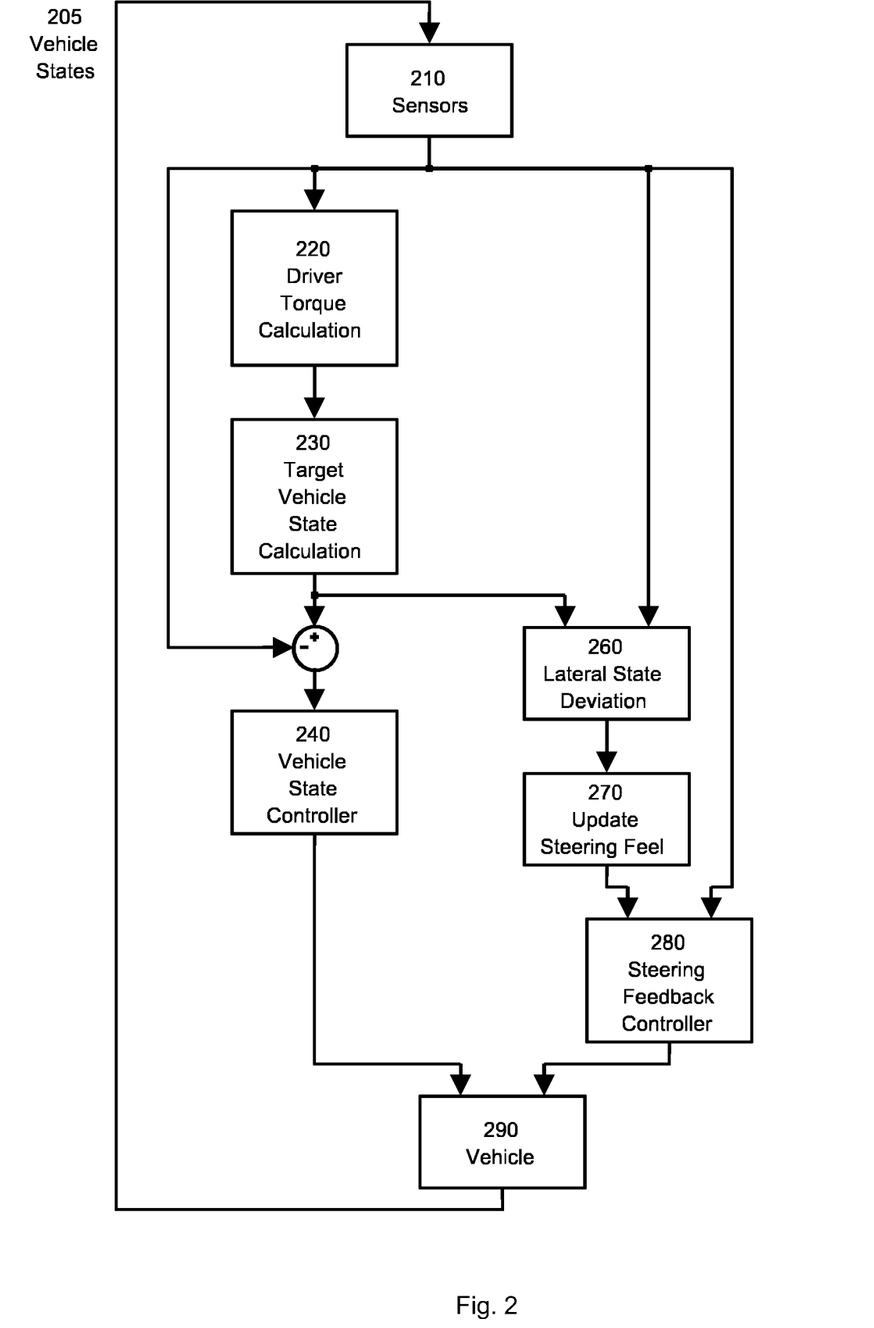
FIG. 2. Control scheme for position and feedback control.

FIG. 2 is a schematic figure of a control scheme for control of the vehicle motion and the steering-wheel torque feedback actuator. From the vehicle (290), there is information of the vehicle states (205). These vehicle states are sensed by the use of sensors (210). Now, there are two control paths, namely one vehicle path control path and one steering feedback actuator control path. In the vehicle path control path, the driver torque is calculated (220), followed by a calculation of the target vehicle yaw and/or lateral vehicle state (230). This target yaw and/or lateral vehicle state is calculated by the use of a pre-defined function from driver torque to target yaw and/or lateral vehicle state. Then, the target yaw and/or lateral vehicle state is compare with a sensed actual one and the resulting control error is minimized by the vehicle state controller (240). With this path, the vehicle path is controlled. In the second control path, the steering feedback torque actuator shall be controlled in such a way that the driver achieves feedback of the deviation between the target and actual yaw and/or lateral vehicle state. This is done by calculating a weighted sum of deviations (260) between the target and actual yaw and/or lateral vehicle states. Based on this deviation between the target and actual yaw and/or lateral vehicle states, the driver torque to steering-wheel angle relation is re-defined (270). Based on this re-defined relation, the steering feedback actuator angle is controlled (280) in such a way that the re-defined driver torque to steering-wheel angle is achieved.

DETAILED DESCRIPTION OF PREFERRED EMBODIMENTS

The present invention for steer-by-wire control is based on the fact that both the feedback torque actuator (130) and the steering position actuator (140) is controlled in such a way that the vehicle is controlled to the desired yaw and/or lateral vehicle state at the same time as the driver is given feedback about the progress of the above-mentioned yaw and/or lateral vehicle state control by the use of the following method steps for the yaw and/or lateral vehicle state control:

1. Measurement of at least one input signal with the aid of a sensor. Here, for the yaw and/or lateral vehicle state control, the sensor signals needed are the torsion bar torque, the steering angle, some measure of the yaw and/or lateral vehicle state, such as e.g. the vehicle yaw rate, vehicle lateral acceleration or the vehicle body sideslip angle, or a linear combination of them.
2. Determination from the torsion-bar torque of a measure of a driver torque, i.e. a torque applied by the driver via a steering wheel (120). The driver torque is the torsion-bar torque compensated by a compensation torque, see further the description of the compensation torque below this first embodiment example.
3. Transformation of the above-mentioned compensated driver torque to a desired yaw and/or lateral vehicle state. When the driver torque is compensated by the compensation torque, the yaw and/or lateral vehicle state is a function of this driver torque.
4. Control of the mentioned one or more yaw and/or lateral vehicle state actuators for the vehicle state control whereby the mentioned desired yaw and/or lateral vehicle state is used as an input signal to the controllers. Here, the steering angle and some measure of the yaw and/or lateral vehicle states are used in the vehicle state control either directly by controlling the steering angle only by a single-input-single-output controller, or by controlling several yaw and/or lateral vehicle state actuators by the use of a controller for over-actuated systems.

Furthermore, beside the yaw and/or lateral vehicle state control, the invention also incorporates the following method step for the feedback torque feedback actuator control:

1. Compare the target yaw and/or lateral vehicle state with the by the use of the sensors measured yaw and/or lateral vehicle state and calculate a yaw and/or lateral vehicle state deviation. Here, the deviation can be any linear combination of the target yaw and/or lateral vehicle state and the, by the use of the sensors, measured yaw and/or lateral vehicle state and therefore also only the measured yaw and/or lateral vehicle state.
2. A re-definition of a above-mentioned compensated driver torque to steering-wheel angle relation describing steering feel based on the yaw and/or lateral vehicle state deviation. The re-definition of the compensated driver torque to steering-wheel angle relation describing steering feel can be in any form such as e.g. a steering-wheel angle offset, a driver torque offset, scaled driver torque or a combination thereof.
3. With the new driver torque to steering-wheel angle relation control the steering assistance actuator to an angle corresponding to the re-defined driver torque to steering-wheel angle relation.

This means that there are two parallel paths in this invention, namely the yaw and/or lateral vehicle state control and the feedback torque actuator control. Now, normally, the vehicle path does not require any interventions from any controller else than the steering position actiator control. So normally, there will be no deviations from the intended yaw and/or lateral vehicle state. However, during low-p road conditions, heavy side-wind or limit handling, the intended yaw and/or lateral vehicle state will not automatically be reached without any type of intervention. Therefore, the most important step of the invention is that if the above-mentioned vehicle position control results in a yaw and/or lateral vehicle state error, this error is transformed to a change in the steering-wheel torque to steering-wheel angle relation describing steering feel. That means that with this new relation the driver will feel that something is happening in terms of the yaw and/or lateral vehicle state error. The driver can, with this feedback, understand that he should reduce speed, or other compensatory actions.

The torque measured with a sensor includes a driver torque which corresponds to that part of the torque, the steering torque, corresponding to the vehicle state which the driver wishes to attain, and also a compensation torque which is the difference between the measured torque and the steering torque. Together with the steering torque, the function of the compensation torque is to describe the torque build-up of the vehicle in the steering-wheel. The object of this is to calculate the steering torque. By compensating the measured torque with the compensation torque, an actual steering signal is obtained which corresponds directly to the desired pattern of movement in the vehicle.

As an example of a method in accordance with the invention, the compensation torque includes one or more of the following torque contributions: steering system friction torque, tyre friction torque, damping torque and steering-wheel self-alignment torque.

In this way, the compensation torque can be better assessed, and this means a better suppression of disturbances. The tyre friction torque takes into consideration the wheel angle, wheel angle history, vehicle position and vehicle velocity, which is important in the case of a low vehicle velocity, since the tyre contact changes more quickly than the twisting of the tyre at high velocities. The steering system friction torque takes into consideration the fact that the steering system needs to have a certain friction for the driver to be able to rest against, so that the whole steering torque does not have to be given by the driver. A certain hysteresis is also needed so that the car is not felt to be "wobbly" or "unruly". The damping torque provides an important damping of the steering angle and thereby the vehicle response. Different damping outwards or inwards when driving straight ahead and when cornering can be preferable so that the damping will match the torque level and gradient. The steering-wheel self-alignment torque means the steering-wheel goes back to the straight-forward position also at velocities so low that there is no yaw and/or lateral vehicle state feedback. The steering-wheel self-alignment torque can be an interpolation table or a software function.

As an example of a method in accordance with the invention, the compensation torque is a function of one or more of the following variables: steering angle, steering angle velocity and/or steering angle acceleration.

In this way, the parameters included in the compensation torque can be assessed in the event of a desired change in a vehicle state.

By the use of the control scheme of the first embodiment, the vehicle is controlled to reach the driver torque based target yaw and/or lateral vehicle state at the same time as the driver achieves feedback of any understeer or oversteer deviations. Note especially that this feedback to the driver is achieved without compromising the calculation of the target yaw and/or lateral vehicle state.

In a second embodiment of the present invention, the before-mentioned steering-wheel torque to steering-wheel angle relation describing steering feel is used in the controller as a function from steering-wheel torque to steering-wheel angle such that the measured steering-wheel torque is used as input and the resulting steering-wheel angle is used as a reference value for the feedback controller in order to minimise the steering-wheel angle error.

Again, the vehicle is controlled to reach the driver torque based target yaw and/or lateral vehicle state at the same time as the driver achieves feedback of any understeer or oversteer deviations. And also here, this feedback to the driver is achieved without compromising the calculation of the target yaw and/or lateral vehicle state.

In a third embodiment, the before-mentioned steering-wheel torque to steering-wheel angle relation describing steering feel is used in the controller as a function from steering-wheel angle to steering-wheel torque such that the measured steering-wheel angle is used as input and the resulting steering-wheel torque is used as a reference value for the feedback controller in order to minimise the steering-wheel torque error.

And also here, the vehicle is controlled to reach the driver torque based target yaw and/or lateral vehicle state at the same time as the driver achieves feedback of any understeer or oversteer deviations in a way that the feedback to the driver is achieved without compromising the calculation of the target yaw and/or lateral vehicle state.

In a fourth embodiment of the present invention, the before-mentioned yaw and/or lateral vehicle state actuators are the steering position actuator (140) in a steer-by-wire steering system (100), rear wheel steering actuators, actuators controlling individual steering angles of the wheels, brakes, engine, controllable four-wheel-drive clutches, controllable differentials, active dampers, electric or hydraulic wheel motors and electrically or hydraulically driven axles, the camber angle on each axle, or the camber angle on each wheel.

And again, the vehicle is controlled to reach the driver torque based target yaw and/or lateral vehicle state at the same time as the driver achieves feedback of any understeer or oversteer deviations in a way that the feedback to the driver is achieved without compromising the calculation of the target yaw and/or lateral vehicle state.

In a fifth embodiment of the present invention, the before-mentioned steering-wheel torque to steering-wheel angle relation describing steering feel is changed to a steering-wheel torque to yaw and/or lateral vehicle state relation describing steering feel and that this yaw and/or lateral vehicle state is a sensed yaw and/or lateral vehicle state, a yaw and/or lateral vehicle state from a vehicle model, a linear combination or a frequency blending of the two.

And again, the vehicle is controlled to reach the driver torque based target yaw and/or lateral vehicle state at the same time as the driver achieves feedback of any understeer or oversteer deviations in a way that the feedback to the driver is achieved without compromising the calculation of the target yaw and/or lateral vehicle state.

In a sixth embodiment of the present invention, the before-mentioned yaw and/or lateral vehicle state error is transformed to a steering-wheel torque vibration signal to be added to said steering-wheel torque to steering-wheel angle relation describing steering feel in order for the controller to minimise the controller error in order for the driver to get feedback of the yaw and/or lateral vehicle state error.

In a seventh embodiment of the present invention, the before-mentioned yaw and/or lateral vehicle state error is transformed to an audible sound request to an audio system of the vehicle in order for the driver to get feedback of the yaw and/or lateral vehicle state error.

In an eights embodiment of the present invention, the before-mentioned yaw and/or lateral vehicle state error is transformed to visible display entity such as e.g. a change in a colour, stepwise or contiguously in order for the driver to get feedback of the yaw and/or lateral vehicle state error.

Still other objects and features of the present invention will be apparent from the detailed description considered in conjunction with the accompanying drawing. It is to be understood, however, that the drawing is designed solely for purposes of illustration and not as a definition of the limits of the invention, for which reference should be made to the appended claims and the description as a whole. It should be further understood that the drawing is not necessarily drawn to scale and that, unless otherwise indicated, it is merely intended to conceptually illustrate the structures and procedures described herein.

The invention claimed is:

1. A method for controlling a feedback torque actuator and at least one of a yaw actuator and a lateral vehicle state actuator in a steer-by-wire steering system of a vehicle to provide a driver feedback of understeer and oversteer deviations, comprising:
   generating at least one input signal with a sensor;
   determining from the at least one input signal a measure of torque applied by a vehicle driver via a steering wheel;
   transforming the measure of torque to at least one of a desired yaw and lateral vehicle state;
   controlling at least one of the yaw actuator and lateral vehicle state actuator based on the at least one of a desired yaw and lateral vehicle state;
   forming a steering-wheel torque to steering-wheel angle relation describing steering feel;
   controlling at least one of the yaw actuator and lateral vehicle state actuator resulting in minimizing a yaw or lateral vehicle state error, wherein the yaw or lateral vehicle state error is an oversteer or understeer deviation;
   transforming the yaw or lateral vehicle state error to a change in the steering-wheel torque to steering-wheel angle relation, thereby forming a new steering-wheel torque to steering-wheel angle relation which includes minimizing a steering-wheel angle error based on a measured steering-wheel torque and a corresponding steering-wheel angle; and
   using the new steering-wheel torque to steering-wheel angle relation for controlling the feedback torque actuator, thereby giving the vehicle driver feedback of the yaw or lateral vehicle state error without changing the desired yaw and lateral vehicle state.

2. The method of claim 1, wherein using the new steering-wheel torque to steering-wheel angle relation includes minimizing a steering-wheel torque error based on a measured steering-wheel torque and a corresponding steering-wheel angle.

3. The method of claim 1, wherein the at least one of a yaw actuator and a lateral vehicle state actuator include at least one of a steering position actuator, a rear-wheel steering actuator, an actuator controlling steering angle of a vehicle wheel, a vehicle brake, a vehicle engine, a controllable four-wheel-drive clutch, a controllable differential, an active damper, an electric or hydraulic wheel motor, an electrically or hydraulically driven axle, an axle camber angle, and a wheel camber angle.

4. The method of claim 1, further comprising transforming the yaw or lateral vehicle state error to a steering-wheel torque vibration signal for addition to the steering-wheel torque to steering-wheel angle relation for giving the vehicle driver feedback of the yaw or lateral vehicle state error.

5. The method of claim 1, further comprising transforming the yaw or lateral vehicle state error to an audible sound request to an audio system of the vehicle for giving the vehicle driver feedback of the yaw or lateral vehicle state error.

6. The method of claim 1, further comprising transforming the yaw or lateral vehicle state error to an indication visible to the vehicle driver display entity for giving the vehicle driver feedback of the yaw or lateral vehicle state error.

7. The method of claim 1, wherein the new steering-wheel torque to steering-wheel angle relation is based on at least one of a sensed yaw and lateral vehicle state and a yaw and lateral vehicle state determined from a vehicle model.

8. The method of claim 1, wherein the measure of torque applied by the vehicle driver is compensated by a compensation torque.

9. A feedback torque actuator control device for a vehicle, comprising:
   at least one of a yaw actuator and a lateral vehicle state actuator in a steer-by-wire system for controlling vehicle yaw and lateral vehicle state;
   at least one torque sensor that generates at least one input signal from torque applied to a steering wheel by a vehicle driver;
   an electronic control unit (ECU) configured to prepares the at least one input signal for input to plural kinds of controllers;
   a feedback torque actuator;
   at least one sensor in communication with the ECU for defining a relation between steering-wheel torque and steering-wheel angle;
   a steering angle sensor configured to determine a steering-wheel angle and being connected to the ECU for determining a vehicle yaw or a lateral vehicle state error, wherein the yaw or lateral vehicle state error is an oversteer or understeer deviation; and
   the ECU is configured for transforming the vehicle yaw and lateral vehicle state error into a changed steering-wheel torque to steering-wheel angle relation and providing the changed steering-wheel torque to steering-wheel angle relation to the feedback torque actuator to give the vehicle driver feedback of the vehicle yaw and lateral vehicle state error which includes minimizing a steering-wheel angle error based on a measured steering-wheel torque and a corresponding steering-wheel angle.

10. A steer-by-wire system for a vehicle, comprising:
   a linkage between vehicle front-axle road wheels and a steering position actuator, wherein the linkage includes a steering rack with associated tie rods connected via a pinion to the steering position actuator, and the steering position actuator comprises an assistance motor;
   an electronic control unit (ECU) in communication with the steering position actuator;
   a steering column connected to the linkage and being in communication with the ECU, the steering column incorporating a torsion bar with a torque sensor for measuring steering torque applied by a vehicle driver;

a steering feedback actuator connected to the steering column and being in communication with the ECU, the steering feedback actuator comprising a motor for giving feedback to the vehicle driver for understeer or oversteer deviations;

a steering wheel connected to the steering column, the steering wheel is configured for the vehicle driver to apply a torque;

the steering column comprising an intermediate shaft having an upper portion, a safety clutch, and a lower portion;

the ECU is configured to interpret data from the torque sensor and determine a vehicle error from the data, the vehicle error being an understeer or oversteer deviation; and the ECU is configured to transform the vehicle error into a change in a steering-wheel torque to steering-wheel angle relation describing steering feel and the ECU providing the change to the steering feedback torque actuator in order for the vehicle driver to get feedback of the vehicle error, which includes minimizing a steering-wheel angle error based on a measured steering-wheel torque and a corresponding steering-wheel angle.

* * * * *